US006762893B2

(12) United States Patent
Wilson et al.

(10) Patent No.: US 6,762,893 B2
(45) Date of Patent: Jul. 13, 2004

(54) SKIP WRITE DETECTION APPARATUS AND METHOD

(75) Inventors: David Robert Wilson, Platteville, CO (US); Steven Gerard Filips, Louisville, CO (US); George Irving Noyes, Pine Cliffe, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 09/961,085

(22) Filed: Sep. 20, 2001

(65) Prior Publication Data

US 2002/0036854 A1 Mar. 28, 2002

Related U.S. Application Data

(60) Provisional application No. 60/236,310, filed on Sep. 28, 2000.

(51) Int. Cl.$^7$ ................................................ G11B 27/36
(52) U.S. Cl. ............................................ 360/31; 360/53
(58) Field of Search .............................. 360/31, 46, 53, 360/25

(56) References Cited

U.S. PATENT DOCUMENTS 3,810,236 A * 5/1974 Horowitz et al. ............. 360/53
4,171,765 A   10/1979 Lemone ....................... 235/312
5,588,007 A   12/1996 Ma ............................. 371/21.2
6,266,202 B1 * 7/2001 Nguyen et al. ............... 360/53
6,384,997 B1 * 5/2002 Wu et al. ..................... 360/46
6,700,718 B2 * 3/2004 Wilson ......................... 360/31

* cited by examiner

Primary Examiner—David Hudspeth
Assistant Examiner—Daniell L. Negron
(74) Attorney, Agent, or Firm—Merchant & Gould P.C.

(57) ABSTRACT

An apparatus and method for detecting a skip write in a write operation of a disc drive are provided. The apparatus and method detect occurrence of a sudden change in back emf of a write signal returning from a write element of the disc drive during a write operation. In the preferred embodiments, the apparatus includes a sample module to sample a write signal from the write element and a detect module to detect a sudden change in the back emf. The method preferably includes the steps of providing a write signal to a write element, monitoring a back emf component of the write signal returning from the write element, detecting a sudden change in amplitude of the back emf component, and initiating a rewrite operation if the sudden change exceeds a threshold.

20 Claims, 5 Drawing Sheets

SKIP WRITE DETECTION APPARATUS AND METHOD

RELATED APPLICATIONS

This application claims priority of U.S. provisional application Ser. No. 60/236,310 filed on Sep. 28, 2000.

FIELD OF THE INVENTION

This application relates generally to disc drives and more particularly to an apparatus and method for detecting errors during a write operation in a disc drive.

BACKGROUND OF THE INVENTION

One of the key objectives of disc drive designers is to maximize the reliability of data in disc drives. This objective is often constrained by the performance requirement of disc drives. That is, increasing the reliability of data often reduces performance of a disc drive. For example, when data is written to the media in a disc drive, the success of a write operation, i.e. whether the media accepted the data, is unknown. One way of ensuring the success of a write operation is by reading the recorded data after each write operation. If there is a data error or data loss, then a re-write operation will be performed. This technique requires all written data to be read which ensures the reliability of the data. However, such technique substantially increases the operation time thereby severely degrading the performance of the disc drive.

A skip write is a write error caused when an object, such as a particle of material, e.g. dust, gets temporarily lodged between the head and the media, causing the head to move away from the media surface. When this happens, the level of magnetic saturation in the media is reduced dramatically, and when the data is subsequently retrieved, errors are present.

The existing techniques for detecting a skip write in a write operation have involved verifying written data via a reading process as described above or a reading process as described in U.S. Pat. No. 5,588,007. Once an error is detected, a re-write operation is performed.

Accordingly there is a need for an efficient technique to detect a skip write in a write operation.

SUMMARY OF THE INVENTION

Against this backdrop embodiments of the present invention have been developed. Embodiments of the present invention include a skip write detection apparatus and method that detects a sudden change of back emf in a read/write head of a disc drive during a write operation which solve the above-mentioned problem.

One embodiment of the present invention, an apparatus for detecting a skip write in a disc drive, includes a sample module to sample write signals from a write element of a read/write head and a detect module to detect occurrence of a sudden change in back emf of the sampled write signals. The detect module includes an amplifier which amplifies the sampled write signals, a filter which filters out acceptable back emf effects of the sampled write signals, and a comparator which compares an amplitude of the back emf of the sampled write signals passing through the filter to a predetermined value. If a skip write occurs, the sudden change in the back emf is indicated by an output of the comparator. The write signals may be voltage signals or current signals.

The output of the filter is preferably connected to an A/D converter to convert the analog write signals to digital write signals before the signals are sent to the comparator.

A threshold module is also connected to the comparator. The threshold module provides the predetermined value when no skip write happens. Further, the predetermined value may be varied by a media zone factor depending on the media zone that the read/write head flies over. The media zone factor is represented by a value preferably stored in a media zone lookup table. In one embodiment, the threshold module includes a programmable register for storing the predetermined value. The predetermined value is sent to one of the inputs of the comparator for detecting the occurrence of a sudden change in the back emf.

Another embodiment of the present invention is a method of detecting a skip write in a disc drive that includes steps of monitoring write signals having back emf, and detecting occurrence of a sudden change in the back emf. Once the sudden change in the back emf is detected, which likely corresponds to the detection of the skip write event, a re-write operation is performed.

The step of monitoring preferably further includes a step of sampling the write signals. The step of detecting preferably further includes steps of amplifying the sampled write signals, filtering out acceptable back emf effects of the sampled write signals, and comparing an amplitude of the back emf to a predetermined value. If a skip write occurs, the sudden change in the back emf is indicated by an output of a comparator. The write signals may be voltage signals or current signals and the method may include a step of converting the analog write signals to digital write signals.

Steps providing a predetermined value when no skip write happens, i.e., when the head is flying at a nominal fly height, and adjusting the predetermined value by a media zone factor depending on a radial media zone that the read/write head flies over may also be included. The media zone factor may be a value preferably stored in a media zone lookup table. The adjusted predetermined value is sent to the comparator for comparing it to the amplitude of the back emf of the sampled write signals.

If the read/write head is moved away from the media during a write operation, i.e. a skip write occurs, the amplitude of the back emf suddenly changes, e.g. in proportion to the loss of magnetic coupling between the read/write head and the media. Such sudden change is detected immediately by embodiments of the present invention. The present write operation can be abandoned and a re-write operation can be initiated immediately. Thus, efficient detection of skip write in a write operation of a disc drive is provided in accordance with the embodiments of the present invention, and the skip write is detected without undergoing a reading verification process.

These and various other features as well as advantages which characterize the present invention will be apparent from a reading of the following detailed description and a review of the associated drawings.

DETAILED DESCRIPTION

Figure 1:
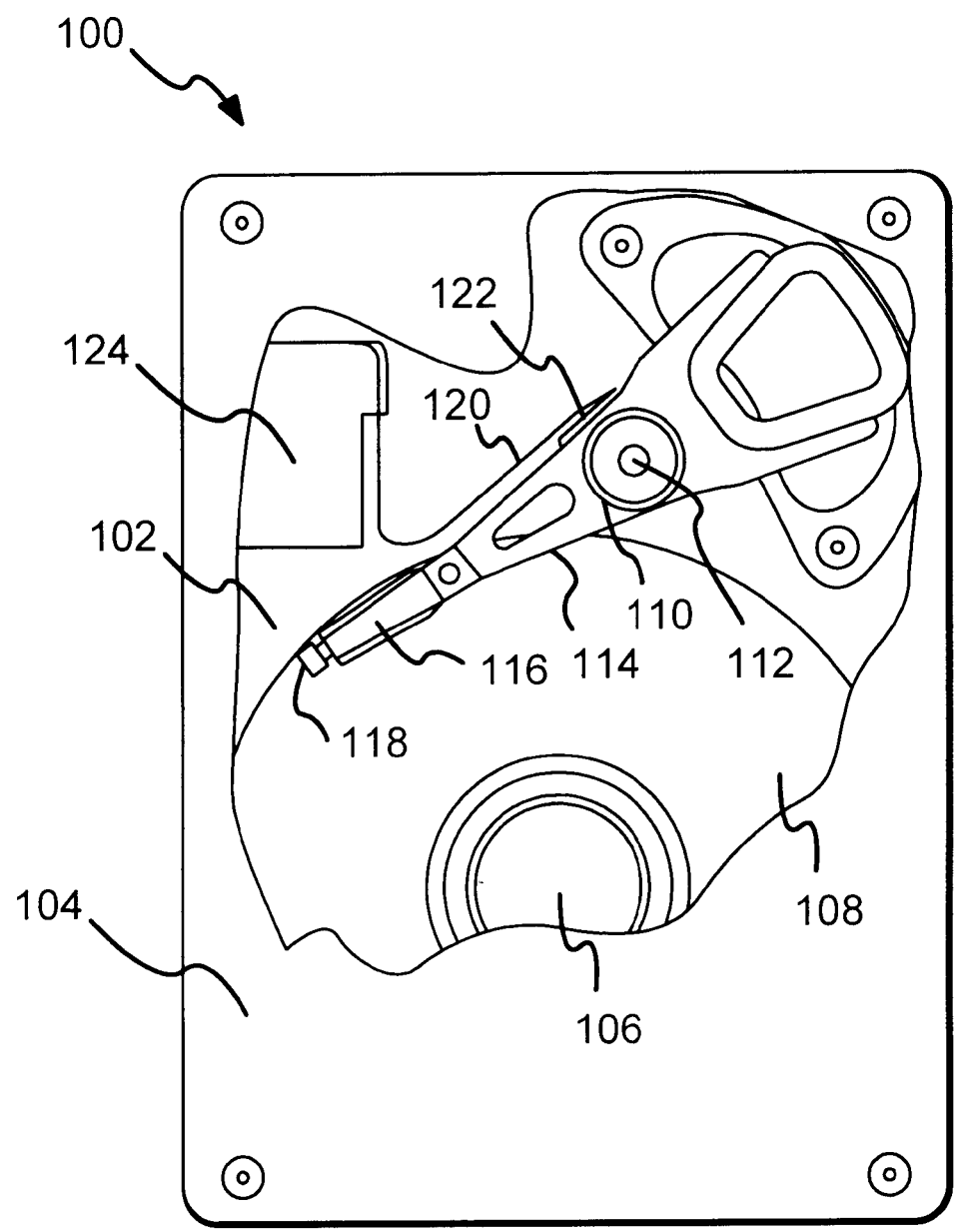
FIG. 1 is a plan view of a disc drive incorporating a preferred embodiment of the present invention.

A disc drive 100 constructed in accordance with the preferred embodiments of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 typically carrying a magnetic resistive and inductive read element and write element, which includes an air bearing slider enabling the head 118 to fly in close proximity above the corresponding surface of the associated disc 108.

A flex assembly 120 provides the requisite electrical connection paths for the actuator assembly 110 while allowing pivotal movement of the actuator assembly 110 during operation. The flex assembly includes a printed circuit board 122 to which head wires (not shown) are connected; the head wires being routed along the actuator arms 114 and the flexures 116 to the heads 118. The printed circuit board 122 typically includes circuitry for controlling the write currents applied to the heads 118 during a write operation and a preamplifier for amplifying read signals generated by the heads 118 during a read operation. The flex assembly terminates at a flex bracket 124 for communication through the base deck 102 to a disc drive printed circuit board (not shown) mounted to the bottom side of the disc drive 100.

Figure 2:
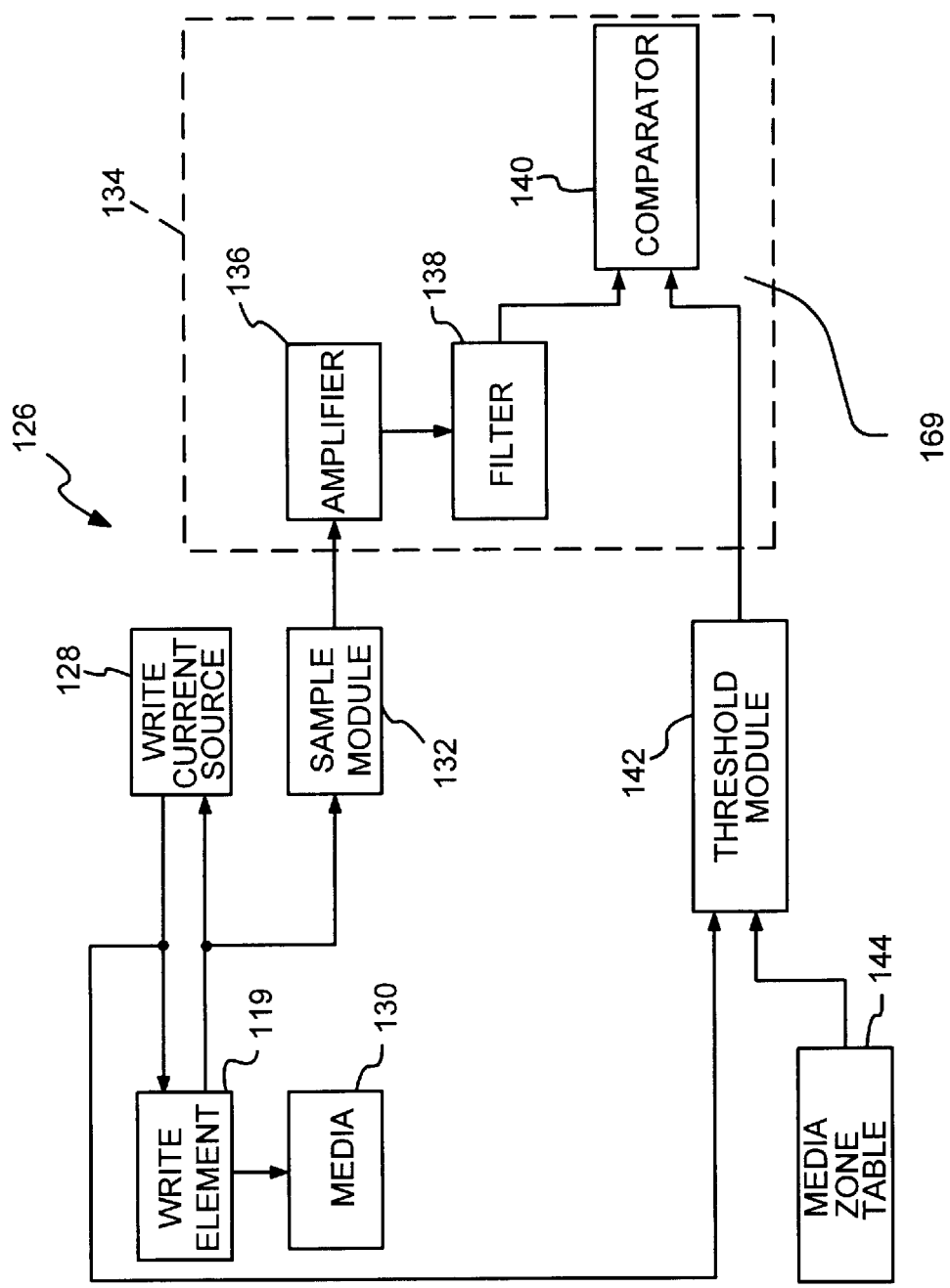
FIG. 2 is a block diagram of a skip write detection apparatus in accordance with a preferred embodiment of the present invention.
Figure 4:
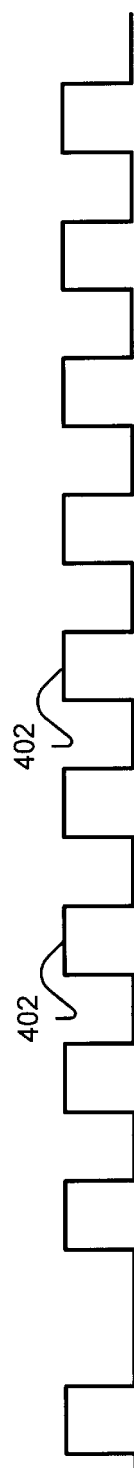
FIG. 4 is a schematic signal diagram representing write signals in accordance with an embodiment of the present invention.
Figure 5:
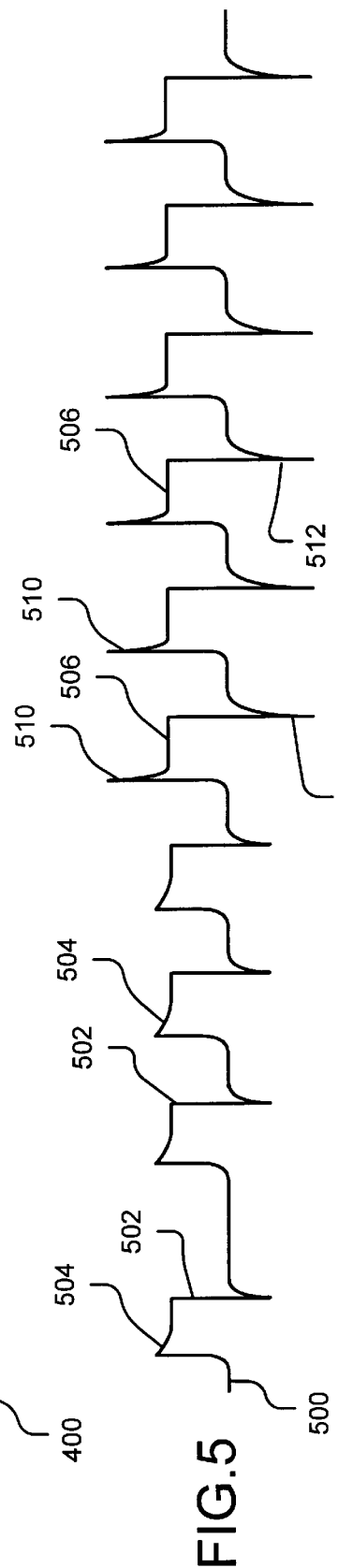
FIG. 5 is a schematic signal diagram representing the sampled write signals having back emf in accordance with an embodiment of the present invention.

In FIG. 2, a skip write detection apparatus 126 for the disc drive 100 is shown. A write current source 128 from the disc drive printed circuit board (not shown) transmits write signals to a write element 119 portion of the head 118. An exemplary write signal is represented by write signal 400 shown in FIG. 4. The write signals are looped back to the write current source 128. During a write operation, the write element 119 writes data onto a media 130 portion of the disc 108. A sample module 132 samples the write signals 400. As shown in FIG. 5, the sampled write signals 500 have a back emf component 510. "Back emf" means back (or counter) electromotive force. Counter electromotive force is defined as the voltage developed in an inductive circuit by a changing current, and the polarity of the induced voltage is at each instant opposite that of the applied voltage. Accordingly, when write current signals are applied or terminated, back emfs are generated (FIG. 5). Further, if the write current signals are changed due to a skip write, a sudden change in the back emf occurs.

When a foreign object, such as a particle of material or dust, is temporarily lodged between the head and the media, the head moves away from the media surface thereby increasing the distance between the head and media. When this happens, the level of magnetic saturation in the media is reduced dramatically. Subsequently, when the data is subsequently retrieved, errors are likely present. Accordingly, by monitoring the change in the back emf, a skip write can be detected.

Referring back to FIG. 2, the apparatus 126 further includes a detect module 134 to detect occurrence of a sudden change in back emf of the sampled write signals 500 from the sample module 132. The detect module 134 preferably includes an amplifier 136 which amplifies the sampled write signals, a filter 138 which filters out acceptable back emf effects of the sampled write signals, and a comparator 140 which compares an amplitude of the back emf of the sampled write signals to a predetermined value 169. If a skip write occurs, the sudden change in the back emf is indicated by an output of the comparator 140. The write signals may be voltage signals or current signals.

The acceptable back emf effects may be caused by uneven surfaces of the head and/or the media. When the head and/or the media have uneven surfaces, the fly height, i.e., the distance between the head and the media will vary. If this happens during a write operation, the level of magnetic saturation in the media is changed. However, such change in magnetic saturation is usually small. These changes in back emf can be filtered out of the sample signal by a clamping filter, such as the filter 138, so that only the skip write induced back emf remains.

A threshold module 142 provides a predetermined value when no skip write happens. Further, the predetermined value may be adjusted by a media zone factor depending on the radial zone of the media that the read/write head is flying over. Since the coverage in magnetic saturation for different zones or areas of the media 130 may be different, adjustment may be made based on the zone over which the head is placed. The media zone factor may be represented by a value stored in a media zone lookup table 144. The media zone lookup table may be stored in memory, such as random access memory (RAM) or read only memory (ROM). The predetermined value is sent to the comparator 140 for detecting the occurrence of a sudden change in the back emf. The modules illustrated in FIG. 2 are preferably integrated on a single silicon chip.

Figure 3:
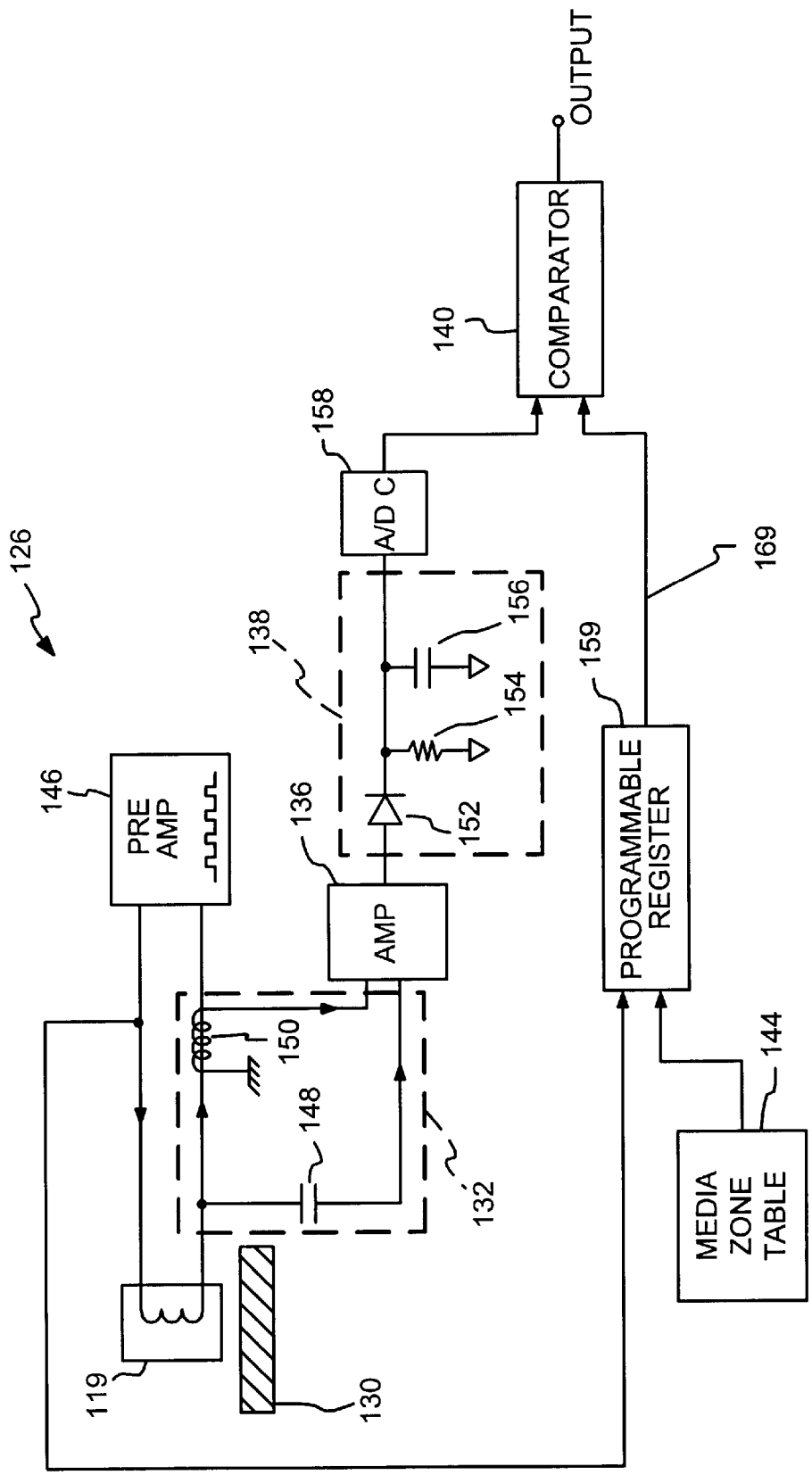
FIG. 3 is a simplified schematic circuit diagram of the skip write detection apparatus in accordance with one of the preferred embodiments of the present invention.

An implementation of one embodiment of the skip write detection apparatus 126 is illustrated in FIG. 3. The write current source 128 (FIG. 2) includes a pre-amplifier 146 that transmits a write signal to the write element 119. An ideal representation of an exemplary write signal is shown in FIG. 4 as a series of square waves representing binary data bits to be written to the media 130. FIG. 5 is a representation of the write signal 400 as the signal may realistically be viewed on an oscilliscope attached to the write element 119. Those skilled in the art will recognize that the form of the write signal depends on the data being written to the media 130. The sample module 132 monitors the voltage change of the write signal via a capacitor 148 or monitors the current change of the write signal via an inductor 150. The clamping filter 138 preferably includes a diode 152, a resistor 154, and a capacitor 156. The clamping filter 138 filters out relatively small changes in emf, but passes relatively large changes in emf.

The detect module 134 preferably further includes an analog to digital (A/D) converter 158 to convert the analog signals from the clamping filter 138 to digital signals. A/D converters typically accept an analog signal as input and output eight or more binary signals. The binary signals represent bits that comprise a digital value. The digital value is a digital version of the analog value output from the clamping filter 138. Sudden changes in back emf result in voltage buildup across the capacitor 156. As the voltage increases across the capacitor 156, the output value of the A/D converter 158 increases. The digital value output from the A/D converter 158 is communicated to the comparator 140.

The comparator 140 compares the digital value output from the A/D converter 158 to the predetermined value 169 to detect the occurrence of a sudden change in the back emf of the sampled signals. A programmable register 159 stores the predetermined value 169 and sends the predetermined value 169 to the comparator 140. The predetermined value 169 represents a maximum acceptable change in back emf. The predetermined value 169 may be determined through experimentation and may be adjusted depending upon a desired sensitivity level. The programmable register 159 is operably connected to the media zone table 144, the comparator 140, and the output of the preamplifier 146. The programmable register 159 can access the media zone table 144 to adjust the predetermined value 169 based on the radial zone of the data disc. The programmable register 159 communicates the predetermined value 169 to the comparator 140 for detecting the occurrence of a sudden change in the back emf.

Figure 6:
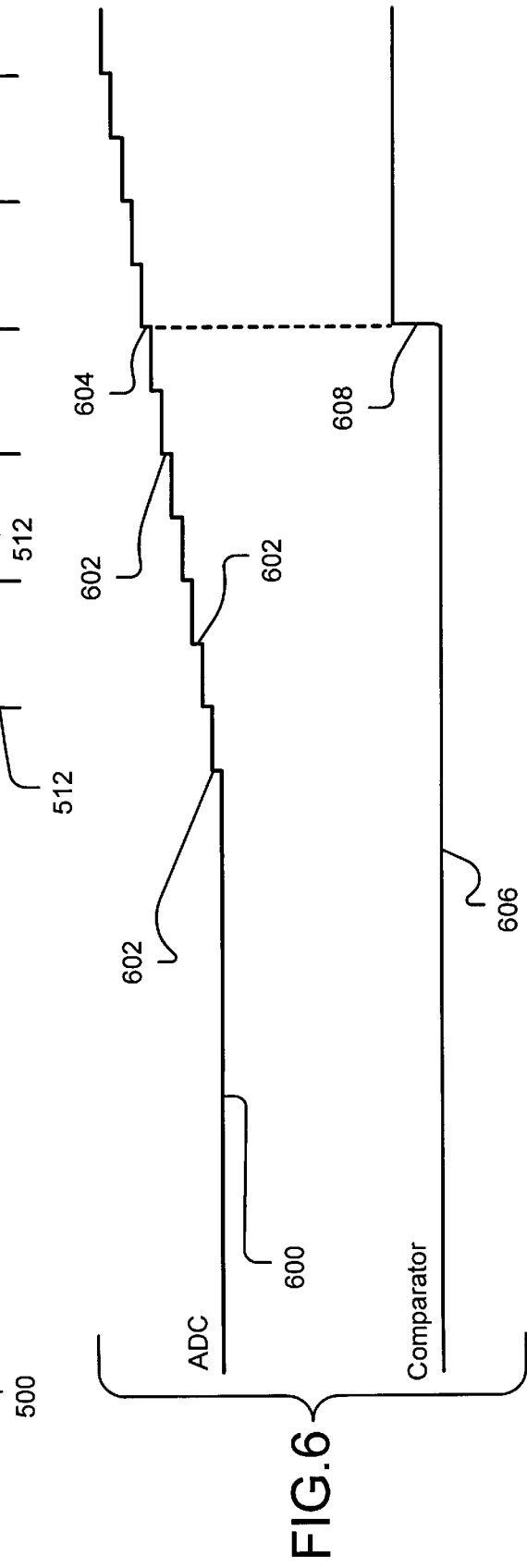
FIG. 6 is a schematic signal diagram representing the output value of the analog to digital converter and the detected skip write signal in accordance with an embodiment of the present invention.

The output of the comparator 140 indicates whether the digital value from the A/D converter 158 is greater than the predetermined value 169 from the programmable register 159. In an embodiment, the output of the comparator is either in an 'on' state or an 'off' state. The 'on' state indicates that the digital value from the A/D converter 158 is greater than the predetermined value 169 from the programmable register 159. Exemplary outputs of the A/D converter 158 and the comparator 140 are illustrated in FIG. 6, and will be discussed in more detail below. FIGS. 4–6 are for illustrative purposes only and are intended to assist the reader in understanding embodiments of the present invention.

FIG. 4 represents a signal diagram illustrating an ideal write signal 400 comprising square waves 402 representing binary bits of data. In an actual embodiment, the square waves generally do not have perfectly square edges, but appear more closely to a signal diagram, such as the one represented by signal diagram 500 of FIG. 5. The signal diagram 500 of FIG. 5 contains substantially square waves 502 having slightly raised portions 504. The slightly raised portions 504 indicate a slight change in back emf that is typical of a disc drive not experiencing a skip write. When the disc drive experiences a rapid change in back emf, which accompanies a skip write, the signal diagram 500 has substantially distorted wave forms 506 having substantial peaks 510 and troughs 512 in voltage level. The substantial peaks 510 and troughs 512 are indicative of a rapid change in back emf that accompanies skip write events.

The substantial peaks 510 and troughs 512 in voltage cause an increase in voltage across the capacitor 156 of FIG. 3. Consequently, the analog value input to the A/D converter 158 of FIG. 3 increases as more peaks 510 and troughs 512 occur. As the analog input to the A/D converter 158 increases, so does the digital value output from the A/D converter 158. The digital value output from the A/D converter 158 appears as shown in FIG. 6 in an A/D converter output value 600. The A/D converter output value 600 of FIG. 6 illustrates the digital value represented by the bits output from the A/D converter 158. It is to be understood that the output of the A/D converter 158 is typically eight or more binary signals. The signal diagram 600 illustrates the value represented by all the eight or more binary signals combined into a single value. When each peak 510 and trough 512 occurs in FIG. 5, there is a corresponding increase 602 in the A/D converter output value 600.

As was discussed, the comparator 140 receives the output of the A/D converter 158 and compares it to the predetermined value (such as 169 of FIG. 3) representing the maximum acceptable level of back emf. An exemplary comparator output signal 606 is shown in FIG. 6 below the output signal 600 of the A/D converter 158. Initially, the output of the comparator is low, indicating that the output of the A/D converter 158 is not greater than the predetermined value. Over time, skip writes cause the A/D converter output value 600 to increase 602. In an embodiment, initial increases 602 in the A/D converter output value 600 do not trigger a change in the comparator output signal 606. However, at some time, the A/D converter output value 600 increases 604 to become greater than the predetermined value.

When the output of the A/D converter 158 increases 604 above the predetermined value, the comparator output signal 606 transitions from low to high. Thus, when the comparator output signal 606 transitions at transition 608 from one state to another, a rapid change in back emf is detected. When the rapid change in emf is detected, remedial action can be taken to ensure that the data of the write signal 500 is written successfully to the data disc. The embodiment of FIG. 7 illustrates a method of detecting a skip write and rewriting the data.

Figure 7:
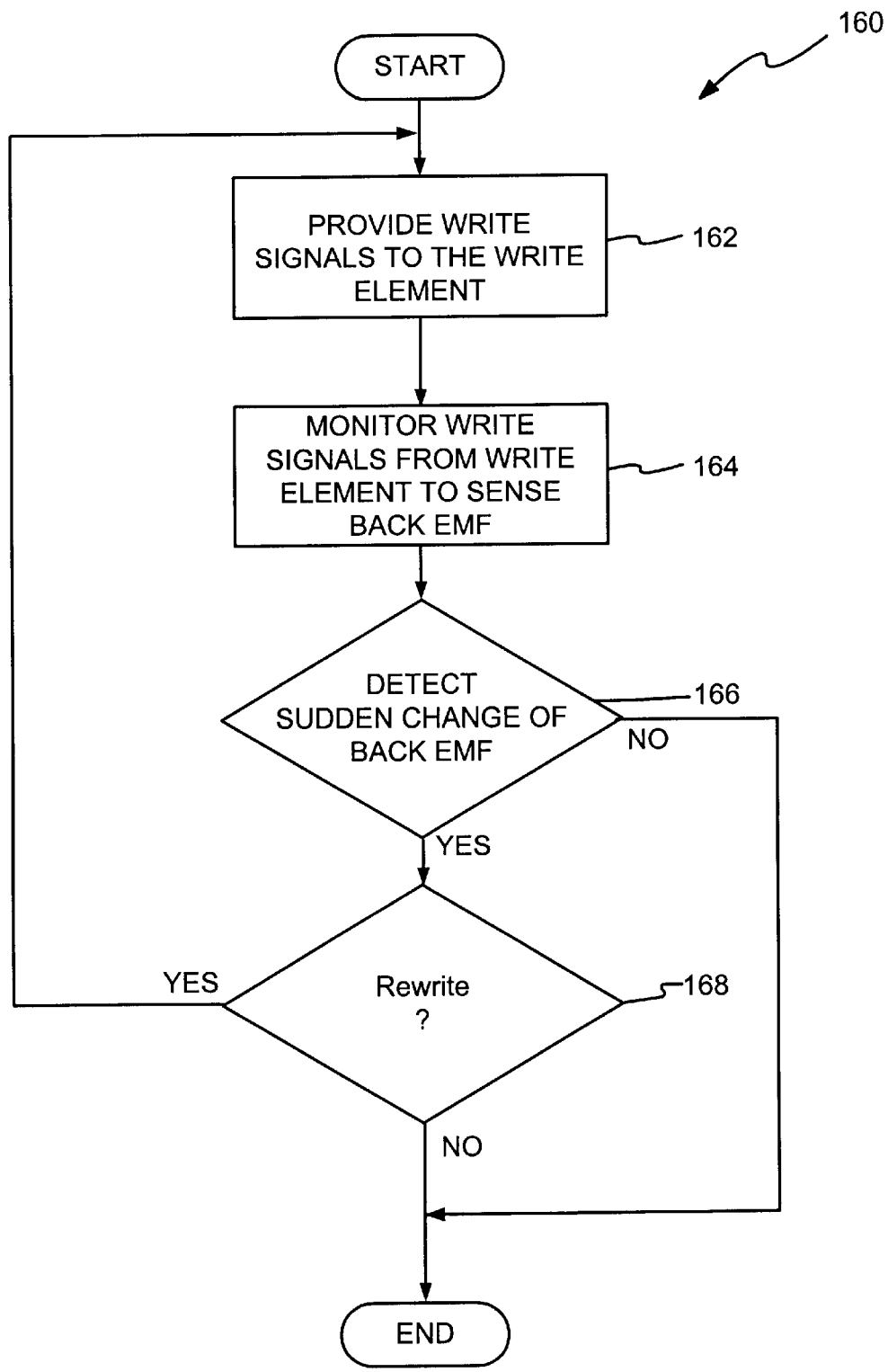
FIG. 7 is an operational flow diagram of the method of detecting a skip write during a write operation, in accordance with an embodiment of the present invention.

FIG. 7 illustrates a write process 160 in a disc drive, which is capable of detecting a skip write during the write process, according to the preferred embodiments of the present invention. The write process 160 begins in a write operation 162. The write operation 162 provides a write signal to a write element of the read/write head. Control then transfers to monitoring operation 164 where the write signal is monitored during the write process 160, to sense back emf in the write signal. Control then transfers to query operation 166 in which detection of occurrence of a sudden change in back emf of the write signal is carried out. If a sudden change occurs, control then transfers to a rewrite determination operation 168. If there is no sudden change in back emf in query operation 166, then control transfers or bypasses the rewrite operation 168 and the write process 160 ends.

The rewrite determination operation 168 determines whether another write operation should be executed to test for a skip write. The determination operation 168 may check whether a counter has reached a predetermined maximum number. The counter may be incremented on every occurrence of a write operation 162. If it is determined that another write should be executed, the write process 160 starts again with the write operation 162. An actual embodiment may include performing the write operation 162, the monitoring operation 164, and the query operation 166 a predetermined maximum number of times. If it is determined in the rewrite determination operation 168 that a rewrite should not occur (i.e., the maximum number of writes has been executed), then processing ends. In another embodiment, if the maximum number of writes is executed such that the rewrite determination operation 168 takes the "no" path, the write process 160 may be executed again at another track on the disc.

In summary, an embodiment of the present invention may be viewed as an apparatus for detecting a skip write in a disc drive (such as 100) that includes a sample module (such as 132) and a detect module (such as 134). The sample module (such as 132) samples a write signal (such as 500) from the write element (such as 119). The detect module (such as 134) is coupled to the sample module (such as 132) and detects an occurrence of a sudden change in back emf of the write signal (such as 500). The detect module (such as 134) may include an amplifier (such as 136), which amplifies the sampled write signal (such as 500), and a filter (such as 138) which filters out acceptable back emf effects (such as 504) of the sampled write signal (such as 500). The detect module (such as 134) may further include a comparator (such as 140) which compares the back emf of the sampled write signal to a predetermined value (such as 169). If a skip write occurs, the sudden change in the back emf is indicated by an output (such as 606) of the comparator (such as 140).

An embodiment may further be viewed as a method of detecting a skip write in a disc drive (such as 100). The method includes monitoring (such as 164) a write signal (such as 500) returning from the write element (such as 119) and detecting (such as 166) an occurrence of a sudden change in back emf of the write signal (such as 500). The method may further include sampling (such as 164) the write signal (such as 500). Still further, detecting (such as 166) may include amplifying (such as 136) the sampled write signal, filtering (such as 138) out acceptable back emf effects of the sampled write signal (such as 500), and comparing (such as 140) an amplitude (such as 600) of the back emf to a predetermined value (such as 169). Detecting (such as 166) may further include a step of converting (such as 158) an analog write signal (such as 500) to digital write signal (such as 600).

Accordingly, preferred embodiments of the present invention provide an immediate detection of the skip write in a write operation so that the data can be rewritten immediately to minimize the error rate impact on the performance of the disc drive.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the exemplary filter could be eliminated if the unevenness of the surfaces of the heads and/or media is negligible. Numerous other changes may be made which will readily suggest themselves to those skilled in the art and which are encompassed in the spirit of the invention disclosed and as defined in the appended claims.

What is claimed is:

1. An apparatus for detecting a skip write of a write element disposed over media, comprising:
   a sample module, coupled to the write element, to sample a write signal from the write element, the sampled write signal having back emf generated due to proximity of the write element to the media; and
   a detect module, coupled to the sample module, to detect occurrence of a sudden change in the back emf generated due to proximity of the write element to the media.

2. The apparatus of claim 1, wherein the detect module comprises an amplifier which amplifies the sampled write signal, a filter which filters out acceptable back emf effects of the sampled write signal, and a comparator which compares an amplitude of the back emf of the sampled write signal to a predetermined value, wherein if a skip write occurs, the sudden change in the back emf is indicated by an output of the comparator.

3. The apparatus of claim 1, wherein the detect module comprises an amplifier which amplifies the sampled write signal.

4. The apparatus of claim 3, wherein the detect module comprises a filter which filters out acceptable back emf effects of the sampled write signal.

5. The apparatus of claim 1, wherein the sample module comprises a capacitor to monitor a voltage change of the write signal.

6. The apparatus of claim 1, wherein the sample module comprises an inductor to monitor a current change of the write signal.

7. The apparatus of claim 2, further comprising an A/D converter, coupled between the filter and the comparator, to convert the analog write signal to digital write signal.

8. The apparatus of claim 2, further comprising a threshold module which provides the predetermined value when no skip write happens.

9. The apparatus of claim 8, wherein the predetermined value is adjusted by a media zone factor depending on a media zone that the write element flies over.

10. The apparatus of claim 9, wherein the media zone factor is represented by a value preferably stored in a media zone lookup table.

11. The apparatus of claim 10, wherein the threshold module comprises a programmable register for storing the predetermined value.

12. A method of detecting a skip write of a write element flying over media, comprising steps of:
    (a) monitoring a write signal returning from the write element containing a back emf generated by proximity of the write element to the media; and
    (b) detecting occurrence of a sudden change in the back emf of the write signal generated due to proximity of the write element to the media.

13. The method of claim 12, wherein the monitoring step (a) comprises a step of sampling the write signal.

14. The method of claim 12, wherein the detecting step (b) comprises steps of:
    (b)(i) amplifying the sampled write signal;
    (b)(ii) filtering out acceptable back emf effects of the sampled write signal; and
    (b)(iii) comparing an amplitude of the back emf to a predetermined value.

15. The method of claim 12, wherein the write signal is an analog write signal, and said method further comprises a step of converting the analog write signal to a digital write signal.

16. The method of claim 14, further comprising a step of providing the predetermined value when no skip write happens and a step of adjusting the predetermined value by a media zone factor depending on a media zone that the write element flies over, the media zone factor being represented by a value preferably stored in a media zone lookup table, the adjusted predetermined value being sent to the comparator for comparing to the amplitude of the back emf of the sampled write signal.

17. A method of writing data from a write element to media, comprising steps of:
    (a) providing a write signal to the write element;
    (b) monitoring a back emf component of the write signal returning from the write element;
    (c) detecting a sudden change in amplitude of the back emf component;
    (d) initiating a re-write operation if the sudden change exceeds a threshold.

18. A skip write detection device, comprising:
    a servo controller to provide a write signal to a write element flying over media; and
    means for detecting occurrence of a sudden change in a back emf component of the write signal returning from the write element generated from proximity of the write element to the media.

19. The skip write detection device of claim 18 wherein the means for detecting occurrence of a sudden change in back emf comprises:

a sample module sampling the write signal and outputing a sampled write signal; and a detect module receiving, filtering, and digitizing the sampled write signal to compare a back emf value to a predetermined value representing a maximum acceptable level of back emf.

20. The skip write detection device of claim 19 further comprising:

a threshold module for generating the predetermined value representing the maximum acceptable level of back emf; and a media zone lookup table storing media zone factors accessible by the threshold module for adjusting the predetermined value based on a radial disc zone.

* * * * *